April 19, 1955 J. E. JACOBS 2,706,790

X-RAY DETECTION

Filed Oct. 18, 1950

INVENTOR:–
John E. Jacobs
BY:–
Spencer, Johnston, Cook & Root
Attys.

United States Patent Office 2,706,790 Patented Apr. 19, 1955

2,706,790

X-RAY DETECTION

John Edward Jacobs, Oconomowoc, Wis., assignor to General Electric Company, a corporation of New York Application October 18, 1950, Serial No. 190,801

11 Claims. (Cl. 250—83.3)

Figure 1:
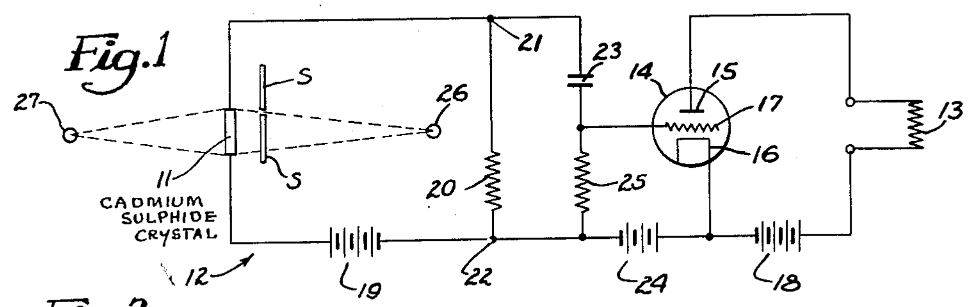

The present invention relates in general to semi-conductors, and has more particular reference to the employment of a semi-conductor for X-ray detection purposes, the invention pertaining specifically to the use of cadmium sulphide as an X-ray responsive detector.

For the purpose of the present disclosure, a semi-conductor may be defined as a substance having electrical resistance, or reactance, or both, which vary in accordance with the intensity of light or other rays, to which the substance is exposed.

Electrical resistance and electrical reactance, either inductive or capacity reactance, or both, are the characteristics of electrical conductors which tend to prevent or impede the flow of electrical current therethrough under the influence of an electromotive force, the combined flow resistive effect of resistance and reactance, in a given conductor material, being commonly referred to as the electrical impedance of the material.

A semi-conductor, in the absence of rays to which it responds, may have impedance characteristics of such high order as to constitute it as an insulator capable of substantially preventing flow of electrical power therethrough. The impedance of the material, when irradiated with rays to which it is responsive as a semi-conductor, may be reduced as a proportional function of incident ray intensity, whereby the material becomes electrically conducting in proportion to the intensity of exciting rays impinging thereon. The ability of a semi-conductor thus to alter its impedance in response to incident ray intensity may be employed for many useful purposes, by connecting the semi-conductor in electrical translation systems designed to perform, or control the performance of, desired work operations, in response to ray induced changes in the impedance of the so connected semi-conductor.

Perhaps the most widely known semi-conductors are the so-called photo-sensitive materials which, in the absence of visible light, are virtual insulators, but which become electrically conductive in the presence of light rays in the visible light spectrum and adjacent infra red and ultra violet portions thereof, such photo-sensitive materials in recent years having gone into widespread use in photo-electric control equipment.

A semi-conductor usually is usefully responsive only to rays of the particular character which affect it, being relatively unresponsive to other rays. Thus, a semi-conductor may be effectively responsive to light rays of wave length within a limited range or portion of the light spectrum, and substantially unresponsive to rays of wave length outside of such range. Each semi-conductor thus responds to its corresponding characteristic exciting ray or rays. The present disclosure is the result of the conception that a semi-conductor responsive to X-rays might be found. While it has heretofore been noted that cadmium sulphide and, perhaps, other materials have X-ray sensitivity, no means for effectively employing cadmium sulphide or other material for the precise detection of X-rays was known prior to the investigation which led up to the discoveries herein set forth.

An important object of the present invention thus resides in the provision of effective X-ray responsive control means adapted to the performance of any desired control function, including X-ray inspection of subjects or objects requiring inspection, X-ray intensity control, regulation of operating power supply to X-ray generating equipment, interval timing of X-ray application, and any other operation desirably accomplished in response to the existence of, or the intensity or duration of, detectable X-rays at a detecting station.

Another important object is to apply a suitable semi-conductor as an effective X-ray detector; a further object being not only to discover a suitable X-ray responsive semi-conductor, but also to provide for employing the same effectively in the detection of X-rays.

Another object resides in providing new and improved methods for using a semi-conductor for ray detecting purposes, and more particularly for the detection of X-rays; a further object being to employ cadmium sulphide as a semi-conductor and to apply the same effectively as a ray detector by rendering its ray-responsive characteristics exceedingly precise, uniform and sensitive; a still further object being to provide novel means for and method of conditioning the semi-conductor for response sensitivity by applying thereto, as a sensitizing bias, rays of selected character different from the rays to which it is desired to render the semi-conductor sensitive; yet a further object being to provide for biasing cadmium sulphide, specifically for X-ray sensitivity, by applying a visible light bias having wave length of the order of 5200 Angstroms.

Briefly stated, the present invention provides for the detection of penetrating rays, such as X-rays, by using crystalline cadmium sulphide as a detector, the response of the detector to incident rays being determined by measuring the alternating current impedance of the detector material, as distinguished from its direct current resistance. In accordance with a preferred mode of practicing the invention, the impedance of the detector is measured in terms of electrical potential produced in an impedance measuring circuit connected with the detector, such potential being applied, as through a suitable translation system, to control the actuation of a relay comprising a load device operable in response to predetermined variation in the intensity of penetrating rays impinging upon the detector. The invention also teaches the possibility of increasing the response sensitivity of cadmium sulphide as a ray detector by applying light rays having wave length of the order of 5200 Angstroms as a bias on the detector.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a diagrammatic showing of apparatus embodying a semi-conductor for ray detecting purposes; and Figs. 2–6, inclusive, are graphical charts illustrating the performance of cadmium sulphide as a semi-conductor in accordance with the present disclosure.

To illustrate the invention, the drawings show a semi-conductor comprising a cadmium sulphide crystal 11, interconnected in a suitable electrical translation system 12, designed to measure the impedance of the crystal in terms of electrical power delivered to a load device 13 connected at the output of the system, which load device may comprise any suitable means for the performance of any desired operation in response to the so measured impedance of the crystal.

While any suitable or preferred translation system may be employed, the same, as shown in Fig. 1 of the drawings, preferably comprises an electronic amplifier, including an electron flow amplifying tube 14 having an anode plate 15, an electron emitting cathode 16, and an electron flow regulating grid 17, the plate 15 and cathode 16 being interconnected in an output circuit including a suitable source 18 of plate circuit power and the operable device or load 13 that may be connected in the output of the circuit. The control grid 17 is interconnected in a grid control circuit in which the crystal 11 is also operatively connected, in order that the control grid 17 may be electrically energized for the control of the output circuit in accordance with the transitory impedance values of the crystal.

As shown, the biasing circuit may comprise the crystal 11, a preferably uni-directional power source 19, and a ballast or control resistor 20 interconnected in series, in order that potential corresponding with the impedance characteristics of the crystal may be developed at the opposite ends 21 and 22 of the resistor 20. The control grid 17 may be connected with the crystal controlled circuit at the connection point 21, preferably through a condenser 23 for filtering uni-directional voltage components and allowing the application only of fluctuating voltage components on the grid 17 from the crystal controlled biasing circuit. If it be desired to apply uni-directional as well as fluctuating voltage components on the control grid 17, the condenser 23 may be eliminated; and, if desired, means may be substituted for excluding fluctuating voltage components while passing the uni-directional component, if it be desired to control the load device 13 in response to such uni-directional component.

Means for applying a suitable bias between the cathode 16 and grid 17 may also be provided, the same preferably comprising a suitable source 24 of grid biasing power and a regulating resistor 25 interconnected in series between the cathode and the grid, the connection point 22 of the crystal controlled biasing circuit being connected with the grid bias means, as at a connection point between the cathode 16 and the resistor 25. When the crystal 11 is exposed to X-rays emanating as from a ray source 26, in the total absence of visible light, the impedance of the crystal changes substantially in proportion to the intensity of impinging X-rays. Where the applied X-rays are of pulsating character, the impedance change in the crystal follows the pulsations of the impinging X-rays and consequently establishes a corresponding voltage across the resistor 20, which, being applied to the control grid 17, produces corresponding amplified power pulsations for application to the load device 13 connected at the amplifier output. Irradiation of cadmium sulphide with X-rays of fluctuating intensity results in the development, across the resistor 20, of voltage having a uni-directional as well as a fluctuating component.

X-rays produced by operation of the usual X-ray generating tubes electrically excited by alternating current power, as for instance at 60 cycles, comprise X-ray energy pulsations at a frequency corresponding with the frequency of the energizing power applied to the generator for the operation thereof. X-rays of uniform, non-pulsating character can, of course, be produced and applied upon the crystal, in which case the voltage developed across the resistor is of uni-directional character, and consequently the translation system 12 would of necessity be designed to measure the magnitude of the uni-directional impedance of the crystal, rather than the fluctuating impedance thereof.

Cadmium sulphide cystals also exhibit impedance characteristic changes when exposed to visible light rays, as from the light source 27, and the extent of such light induced impedance change is in proportion to the intensity of the impinging light rays. Accordingly, when the crystal is exposed to light rays from the source 27 and is simultaneously exposed to X-rays from the source 26, the voltage available at the connection points 21 and 22 contains components which correspond with the light controlled impedance value of the crystal and components corresponding with the X-ray controlled impedance of the crystal. Consequently, if light at uniform intensity is applied on the crystal, the corresponding voltage component across the resistor 20 will be uniform, while the voltage component corresponding with the X-rays impinging on the crystal will change in accordance with the intensity of applied rays. Where the impinging rays comprise intensity pulsations, the same may be applied through the condenser 23 to control the operation of the amplifier, while the uniform voltage component established by illumination of the crystal from the source 27 at uniform intensity, as well as the uni-directional X-ray induced component, will be excluded from the amplifier system by the action of the condenser 23.

The present invention is not necessarily restricted to the excitation of the crystal 11 by uniform light rays and by pulsating X-rays, but applies, in its broader aspects, to the excitation of the crystal by means of visible light or by means of X-rays, or both, and whether or not the light rays or X-rays pulsate, there being many possible advantageous applications involving the excitation of the crystal either by X-rays or by visible light, where either the light rays or X-rays are of uniform or of pulsating intensity character. Nevertheless, the present invention is particularly well adapted for use in connection with the detection of pulsating X-rays, where the crystal is illuminated with visible light rays of uniform intensity, applied to the crystal as a light bias, especially where such light bias comprises green light having a wave length of the order of 5200 Angstrom units. By applying such a light bias, it has been discovered that the crystal is rendered highly sensitive to impedance changes in response to X-ray irradiation, X-ray induced impedance fluctuations, when the crystal is under light bias at a wave length of 5200 Angstroms, being of the order of ten times the X-ray induced impedance fluctuations produced in the absence of a light bias.

In connection with the present invention, a thorough investigation of the performance of cadmium sulphide crystals of the so-called beta form has been carried out using X-rays having a wave length of 1.54 Angstrom units, over a range of X-ray intensities from 100 to 100,000 quanta per second. Cadmium sulphide crystals have thus been subjected to total X-ray energy quanta exceeding $10^{12}$ with no noticeable change in characteristics, thus demonstrating that the X-ray detection characteristics of the crystals are constant, for all practical purposes, when irradiated with X-rays.

The X-ray beam applied to the crystals thus examined was of pulsating character at a pulsating frequency of 60 cycles per second. To determine their X-ray responsive impedance characteristics, a suitable uni-directional electromotive force, of the sort supplied by the source 19 in Fig. 1, was applied to the crystals and resultant current flow therethrough was accurately measured. The resulting crystal current, obtained in response to pulsating irradiation of the crystal, was found to contain an alternating as well as a uni-directional component. Through the above mentioned intensity range of X-ray irradiation, it was found that the uni-directional component of crystal current varied substantially linearly with the intensity of incident X-rays, while the alternating component varied as the square of the incident intensity. This phenomenon is explainable upon the theory that the alternating component is proportional to the rate of recombination of electrons in the effective conduction band or zone of the irradiated crystal, no such recombination occurring in response to uni-directional electron flow.

In all of the crystals examined the ratio of measured output current to incident X-ray intensity was found to vary from one crystal to the next. These ratios, however, were found to differ only by a common factor; and the magnitude of the uni-directional component of crystal current was found to be approximately 10,000 times that of the alternating component, when crystal current is of the order of 10 microamperes. The ratio, however, decreases with increase in the intensity of ray impact on the crystal, that is to say, with increase in crystal current. When crystal current is of the order of one milliampere, the uni-directional component of crystal current is of the order of 1,000 times that of the fluctuating component. It was found, also, that the time lag before crystal current reaches a maximum value, following application of the X-ray beam, is of the order of several hours so far as the uni-directional current component is concerned, but is of the order of a small fraction of a second for the alternating component, in the same crystal.

Figures 2, 3, 4, 5, 6:
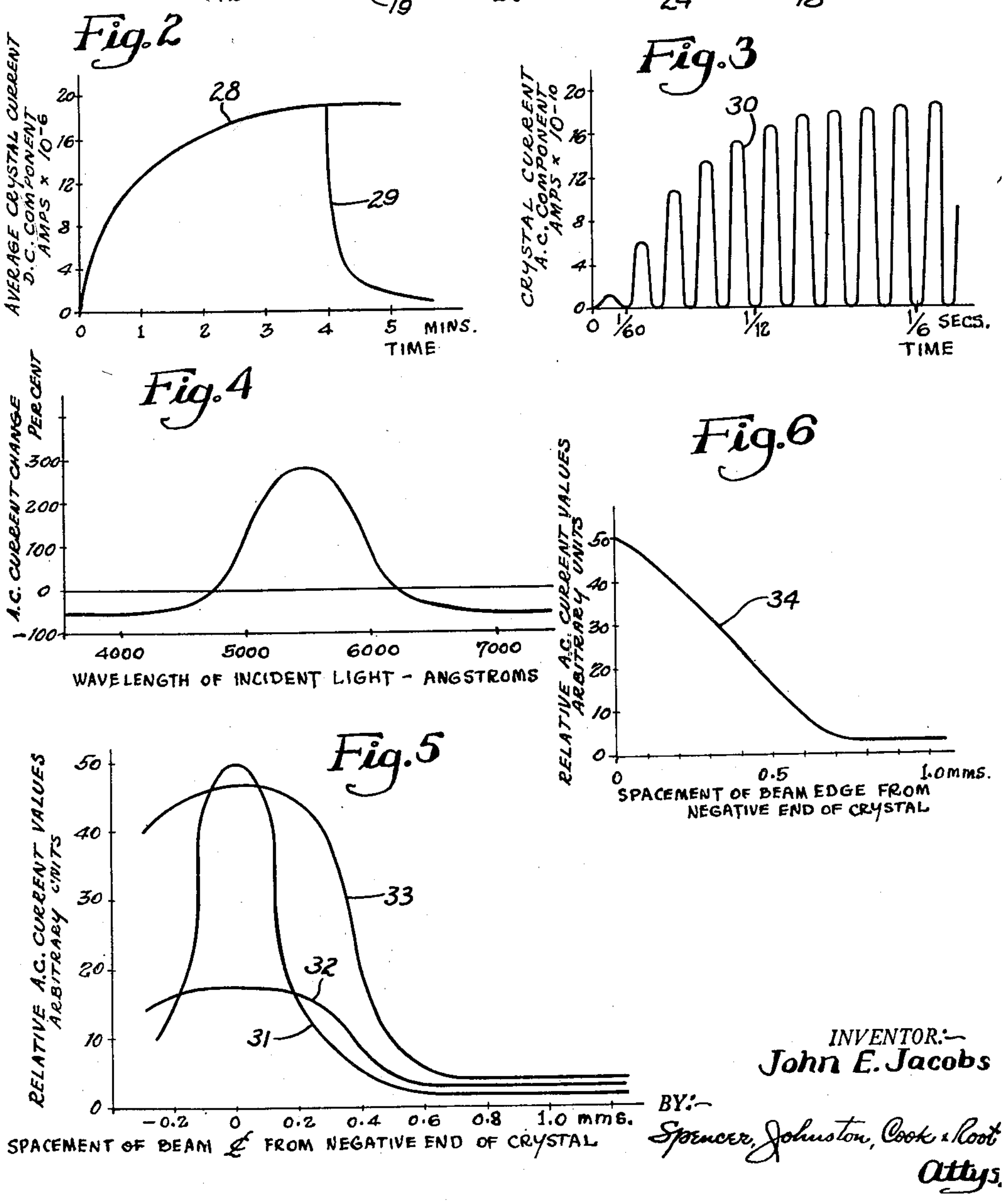

These characteristics are illustrated in the graphs comprising Figs. 2 and 3, wherein the curve 28 approximates an exponential wave and illustrates values of uni-directional crystal current during an initial period of several minutes following X-ray application to the crystal. The curve 29 illustrates the decline of crystal current following discontinuation of X-ray application to the crystal. Fig. 3 shows the response curve 30 obtained by photographing, as with an electron oscillograph, the fluctuating component of crystal current during the fractional portion of one second following application of X-rays to the crystal. Upon termination of X-ray irradiation on the crystal, flow of crystal current ceases immediately at the conclusion of the cycle of crystal current flow then in being. The graphs show a five minute time lag required for the uni-directional component to reach a near maximum value, although a true maximum value of the uni-directional component is actually attained only after an elapsed time interval of the order of hours rather than minutes, and a time lag of about ⅕ second for the fluctuating current component to reach its maximum value.

This phenomenon may be explained upon the theory that the alternating component is a measure of the change in the number of electrons present in the conduction band of the crystal, as a function of time. Accordingly, employment of the alternating component of crystal current, to the exclusion of the uni-directional component, permits the immediate measurement of crystal current for the determination of X-ray intensity, and thus avoids the delay of several minutes necessary to achieve a stable condition of uni-directional current, following initial application of X-radiation to the crystal. Measurement of the alternating component only permits the advantageous use of high gain alternating current amplifiers in the translation system in the interests of effective instrumentation.

Some crystals were found to exhibit random or eccentric impedance characteristics in the absence of irradiation at polarizing field strengths in excess of 150 volts per centimeter. Other crystals, while not exhibiting such random characteristics, in the absence of irradiation, showed erratic effects when irradiated; and it was determined that crystals having these erratic characteristics contained structural imperfections and showed lattice distortions, as evidenced by asterism in Laue transmission patterns of the crystals. Crystals showing none of these erratic or eccentric characteristics were found to be free of lattice distortions.

Erratic characteristics similar to the foregoing can be artificially introduced in crystals by annealing the same in an atmosphere of oxygen. Such annealing in oxygen results in increasing the apparent multiplication of the crystal by approximately 100. This perhaps is the result of the introduction of free sulphur atoms into the lattice structure of the crystal, thus producing distortions. Crystal discoloration that is noticeable after annealing the same in oxygen tends to confirm this explanation of the phenomenon. When the crystals are annealed in an oxygen-free atmosphere, there is no structural change in crystal characteristics. Accordingly, since eccentric and erratic crystal response occurs only in crystals exhibiting some form of lattice defect, it is suggested that such abnormal response characteristics are produced when electrons move between loosely bound electron trapping positions in the crystal structure and the normal conduction band of the crystal. Employment of the alternating component of crystal current, for X-ray detection purposes, permits the application of secondary illumination or light bias to the crystal. When light having a wave length of the order of 5200 Angstroms is directed on a crystal irradiated by pulsating X-rays, both uni-directional and fluctuating components of X-ray responsive crystal current are increased by a factor of 10, as compared with such X-ray induced components in the absence of the light bias.

Application of blue light having a wave length of 5000 Angstroms, or less, or red light of wave length in excess of 5400 Angstroms, results in a decrease in crystal current, the phenomena being graphically illustrated in Fig. 4 of the drawings. As compared with the time lag encountered in the absence of light bias, the employment of a green light bias having a wave length of 5200 Angstroms decreases slightly the time lag required for the fluctuating component of crystal current to reach its maximum value following application of X-rays to the crystal. As a consequence, the employment of a green light bias of proper magnitude and the utilization of the fluctuating component of crystal current makes it practical to employ cadmium sulphide crystals as detector elements in X-ray responsive control systems.

Another phenomenon noted in connection with the X-ray excitation of cadmium sulphide crystals is the response effects obtained by irradiating portions of the crystal only, as by means of adjustable shutters indicated at S in Fig. 1 of the drawings. By virtue of the polarity of the power source 19, one end of the crystal 11 is held electrically negative with respect to its opposite end. By irradiating the crystal with a narrow beam of X-rays progressively from one end to the other, the current response of the crystal was found to be as shown in Fig. 5 of the drawings, in which the curves 31 and 32 respectively illustrate current response to X-ray beams of different widths, both in the absence of light bias, the curve 31 corresponding with relatively narrow beam irradiation. The curves 32 and 33 show the current response to beams of identical width, curve 33 being the response obtained with a green light bias. It should be understood that the vertical ordinates employed in drawing the curves 31, 32 and 33 are not identical, the actual peak value of the curve 31 being less than ½ of the peak value of curve 32. The actual peak value of curve 32 is about ⅒ of the peak value of curve 33. The curves, however, clearly show that the crystal is substantially inert except at and adjacent its negative end. As a consequence, in using cadmium sulphide crystals for X-ray detection purposes, it is necessary to apply the beam at the relatively negative end of the crystal, in its mounting, it being unnecessary to irradiate the remaining portions of the crystal.

The curve 34 in Fig. 6 illustrates the current response of a cadmium sulphide crystal when irradiated with an X-ray beam, the edge of which is moved progressively away from the negative end of the crystal. The curve 34, like the curves 31, 32 and 33, indicates that maximum crystal response to crystal irradiation is obtained at the electrically negative end of the crystal, and that the crystal, except at and immediately adjacent its said negative end, is substantially unresponsive.

It has been determined, also, that if the X-ray beam is confined to a narrow crystal region at and adjacent the negative end thereof and blocked by suitable screening means, and then suddenly applied to the crystal by removal of the screen, an initial crystal current in excess of the steady static value is obtained. This phenomenon is affected substantially by the character of the light bias. The application of green light as a bias reduces its intensity and duration, while the application of red light increases the duration of the effect noted. A blue light bias completely eliminates the same. The effect noted is thought to result from the circumstance that, in the crystal region adjacent the negative end of the crystal, field strengths are great enough to permit the large values of apparent crystal multiplication.

These fields result from the existence of positive holes or cavities in this region formed by the ejection of electrons upon X-ray impact on the crystal. The electrons being in the conduction band of the crystal are immediately swept out of its electrically negative end region. The positive space charge at the negative end of the crystal reduces the electrical field over the remaining portions of the crystal, so that the large values of apparent crystal multiplication can not occur in such remaining regions of the crystal. The fact that these remote crystal portions may be irradiated with X-rays substantially without increasing crystal current, as shown more particularly by the graph in Fig. 6, indicates that the current response of the crystal is limited by this space charge effect. The surging effect at the negative end of the crystal when irradiated is thought to be caused by the trapping of electrons, which has the effect of reducing the field strength adjacent the negative end of the crystal. The initial surge current observed is that which would flow in a space charge free crystal, and it is reduced by the effects of the electrons trapped in the crystal toward the relatively positive end thereof, which consequently results in a decrease in the effective field at the negative end of the crystal.

The formation of the positive space charge in the region of the negative end of the crystal verifies the fact that cadmium sulphide is an excess electron or donor type of semi-conductor.

In all crystals that have been examined, currents of over $10^6$ times the current resulting from primary ionization of the crystal by X-rays were observed. Any explanation of this phenomenon must account for the production of additional electrons allowing for the observed multiplication. The energy necessary to produce this additional crystal current can only derive from the applied uni-directional field. In this connection, it is thought that electron donor centers are ionized by primary electrons, equilibrium occurring when electrons are being trapped to form the donor centers at the rate at which they are being ionized by X-ray impingement.

The present invention visualizes the practical application of cadmium sulphide crystals for improved instrumentation in association with X-ray generators and auxiliary equipment. Crystals may be employed separately for X-ray detection purposes by placing the crystal in the path of the beam to be detected. So positioned, the crystal, in association with appropriate translation equipment of the sort shown in Fig. 1, may be used for many desirable control purposes, as, for example, the control of the intensity of the X-ray beam at a desired value, by applying the load device 13 to control equipment for directly or indirectly regulating the intensity of the beam. The apparatus may be employed for liquid level gauge purposes where the liquid to be gauged is enclosed in light impervious containers. Alternately, a crystal and its associated translation system may be employed as a timing device to discontinue the application of the X-ray beam after a selected interval, which may be determined either in terms of time or in terms of X-ray quanta.

Several crystals, each with its associated translation system, may be mechanically arranged to form an X-ray sensitive screen for the examination of objects for defects or irregularities. Such screen may comprise a multiplicity of crystals mounted with their relatively negative ends facing toward the X-ray source to be detected, equipment embodying such screens being especially useful in the examination of packaged food products for the detection of impurities. Since cadmium sulphide crystals can be made in relatively small sizes, it is obvious that a detection screen of fine grain, comprising a multiplicity of closely arranged crystals, can be prepared for the detection of exceedingly small impurities, as in packaged food and other products.

It will be obvious that the practical applications of the present invention may include numerous specific applications wherein X-ray detection of flaws, imperfections or unwanted objects is desired.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. The method of detecting changes in the intensity level of pulsating X-rays which comprises applying said pulsating X-rays upon cadmium sulphide as a semi-conductor to thereby rapidly change the alternating current impedance of the semi-conductor, as a precise function of the intensity of impinging X-rays, while simultaneously changing the direct current resistance thereof at a relatively slow rate, and measuring the alternating current impedance as distinguished from the direct current resistance.

2. The method set forth in claim 1, including the application of visible light rays of selected wave length as a sensitizing bias on the semi-conductor.

3. The method set forth in claim 1, including the application of visible light rays having wave length of the order of 5200 Angstroms as a sensitizing bias on the semi-conductor.

4. The method of detecting changes in the intensity level of pulsating X-rays which comprises applying said pulsating X-rays upon cadmium sulphide as a semi-conductor to thereby rapidly change the alternating current impedance of the semi-conductor, as a precise function of the intensity of impinging X-rays, while simultaneously changing the direct current resistance thereof at a relatively slow rate, producing a flow of current in the semi-conductor proportional to the instantaneous values of direct current resistance and alternating current impedance thereof, isolating the alternating current component of said current from the direct current component thereof, and actuating an operable device in response to change in X-ray intensity level as measured by said alternating current component.

5. Control apparatus for actuating an operable load device in response to rapid change in the intensity level of pulsating X-rays comprising cadmium sulphide as a crystalline semi-conductor element having alternating current impedance characteristics, variable precisely and substantially instantly as a function of the intensity of pulsating X-rays impinging thereon, and direct current resistance characteristics which laggingly follow any change in pulsating ray intensity, means for continuously passing a flow of current in said element, means for isolating the laggingly responsive direct current component of said current from the alternating current component thereof, and electrical translation means controlled in accordance with said alternating current component for operating the load device substantially instantly in response to rapid changes in the intensity level of said X-rays.

6. Control apparatus as set forth in claim 5, including means to apply on said semi-conductor element a light bias comprising visible light rays having a selected wave length.

7. Control apparatus as set forth in claim 5, including means to apply on said semi-conductor element a light bias comprising visible light rays having wave length of the order of 5200 Angstroms.

8. Control apparatus for actuating an operable load device in response to rapid change in the intensity level of pulsating X-rays comprising cadmium sulphide as a crystalline semi-conductor element having alternating current impedance characteristics, variable precisely and substantially instantly as a function of the intensity of pulsating X-rays impinging thereon, and direct current resistance characteristics which laggingly follow any change in pulsating ray intensity, a resistor connected in series with said element, means for continuously passing a flow of current through said resistor and elements to develop potential fluctuating as a function of the laggingly responsive direct current resistance and the precisely responsive alternating current impedance of said element, an electronic amplifier having a control grid and drivingly connected with said load device for actuating the same, and a coupling condenser for applying on said grid a controlling potential corresponding with the instantaneous values of the alternating current impedance characteristics of said element.

9. Control apparatus for actuating an operable load device in response to rapid change in the intensity level of pulsating X-rays comprising cadmium sulphide as a crystalline semi-conductor element having alternating current impedance characteristics, variable precisely and substantially instantly as a function of the intensity of pulsating X-rays impinging thereon, and direct current resistance characteristics which laggingly follow any change in pulsating ray intensity, a measuring circuit in series connection with said element for circulating therethrough a flow of electric current having alternating current and direct current components respectively proportional to the instantaneous values of the impedance and resistance characteristics of said element, an electronic amplifier having a control grid and drivingly connected with said load device for actuating the same, and a coupling network interconnected with said circuit and said grid for applying said alternating current component on said grid while excluding said direct current component therefrom.

10. X-ray detection apparatus comprising a load device to be operated in response to the detection of X-rays, crystalline cadmium sulphide forming a detection element adapted for exposure to X-rays, means for applying light rays of wave length of the order of 5200 Angstroms and of selected substantially constant intensity, as a sensitizing bias on said detection element, means to measure the impedance of said element comprising an electrical power source and a resistor connected in circuit with said detection element, an electron flow amplifier having a control grid, said amplifier being controllingly connected with said load device, and a coupling condenser interconnecting the grid of said amplifier with said circuit to actuate the amplifier in accordance with the alternating current impedance of the detection element as measured in said circuit.

11. X-ray detection apparatus comprising a load device to be operated in response to the detection of X-rays, crystalline cadmium sulphide forming a detection element adapted for exposure to the action of X-rays, means for applying light rays of selected wave length and of selected substantially constant intensity as a sensitizing bias on said detection element, means to measure the impedance of said element comprising an electrical power source and a resistor connected in circuit with said detection element, an electron flow translation device having a control grid, said translation device being controllingly connected with said load device, and a coupling condenser interconnecting the grid of said translation device with said circuit to actuate the device in accordance with the alternating current impedance of the detection element as measured in said circuit.

(References on following page)

References Cited in the file of this patent

UNITED STATES PATENTS

| | | |
|---|---|---|
| 2,218,750 | Hinderer | Oct. 22, 1940 |
| 2,508,098 | Chilowsky | May 16, 1950 |
| 2,537,388 | Woolridge | Jan. 9, 1951 |
| 2,540,490 | Rittner | Feb. 6, 1951 |
| 2,543,039 | McKay | Feb. 27, 1951 |
| 2,546,239 | Rothschild | Mar. 27, 1951 |
| 2,547,173 | Rittner | Apr. 3, 1951 |
| 2,604,596 | Ahearn | July 22, 1952 |

OTHER REFERENCES

"Photo-Conductivity of Incomplete Phosphers," Frerichs, Phys. Rev., vol. 72, #7, October 1, 1947, pp. 594–601.

Frerichs article, Phy. Rev., vol. 76, #12, December 15, 1949, pp. 1869–75.

"The Physics of Electronic Semiconductors," Pearson Technical Paper, 47–34, published by Bell Telephone Laboratories, Inc., N. Y., December 1946, pages 1–14.

"Crystal Counters," Hofstadter, Nucleonics, April 1949, pages 2–27.